US009361550B2

(12) United States Patent  (10) Patent No.: US 9,361,550 B2
Barros et al.  (45) Date of Patent: Jun. 7, 2016

(54) PROCESSING WEBS USING PRINTED GRAPHIC CODE SYMBOL RELATING TO WEB FEATURES

(71) Applicant: TETRA LAVAL HOLDINGS & FINANCE S.A., Pully (CH)

(72) Inventors: Gustavo Barros, Modena (IT); Lars Palm, Åkarp (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 14/420,261

(22) PCT Filed: Jul. 4, 2013

(86) PCT No.: PCT/EP2013/064167
§ 371 (c)(1),
(2) Date: Feb. 6, 2015

(87) PCT Pub. No.: WO2014/023487
PCT Pub. Date: Feb. 13, 2014

(65) Prior Publication Data
US 2015/0286900 A1   Oct. 8, 2015

(30) Foreign Application Priority Data
Aug. 6, 2012 (SE) ..................................... 1250916

(51) Int. Cl.
G06K 15/02  (2006.01)
G06K 19/06  (2006.01)
(Continued)

(52) U.S. Cl.
CPC ............ G06K 15/024 (2013.01); B41F 13/025 (2013.01); B41F 19/00 (2013.01);
(Continued)

(58) Field of Classification Search
None
See application file for complete search history.

(56) References Cited

U.S. PATENT DOCUMENTS 8,834,334 B2 * 9/2014 Palm ...................... B41F 19/00
493/11
9,062,222 B2 * 6/2015 Nilsson ................ B65B 61/025
(Continued)

FOREIGN PATENT DOCUMENTS

CN        101528550 A     9/2009
EP        1 914 168 A1    4/2008
WO        WO 01/51275 A1  7/2001

OTHER PUBLICATIONS

International Search Report (PCT/ISA/210) mailed on Oct. 31, 2013, by the Swedish Patent Office as the International Searching Authority for International Application No. PCT/EP2013/064167.

*Primary Examiner* — Scott A Rogers
(74) *Attorney, Agent, or Firm* — Buchanan Ingersoll & Rooney PC (57) ABSTRACT

An arrangement comprising at least one first processing machine arranged to process a web, and a scanning device arranged to scan the web. The arrangement also comprises a computing device configured to: receive image data of the web, analyze the data, and generate a graphic code symbol based on the analysis, and a printing device arranged to print the graphic symbol on the web for marking a web with data relating to features of the web. At least one second processing machine is arranged to further process the web, a reading device is arranged to read the graphic code symbol of the web, and a control device is configured to: receive image data relating to the graphic code symbol, decode the graphic code symbol to retrieve information regarding features of the web, and control the second processing machine to adapt the further processing of the web according to the features.

12 Claims, 4 Drawing Sheets

(51) Int. Cl.
*G06K 7/14* (2006.01)
*B41F 13/02* (2006.01)
*B41F 19/00* (2006.01)
*B41F 33/00* (2006.01)
*B65B 61/02* (2006.01)

(52) U.S. Cl.
CPC ........... *B41F33/0081* (2013.01); *B65B 61/025* (2013.01); *G06K 7/1447* (2013.01); *G06K 19/06009* (2013.01); *G06K 19/0614* (2013.01); *B41P 2213/90* (2013.01); *B41P 2233/52* (2013.01); *G06K 19/06037* (2013.01)

(56) References Cited

U.S. PATENT DOCUMENTS

| | | | |
|---|---|---|---|
| 2001/0054642 A1* | 12/2001 | Landolt | B65H 26/02 235/375 |
| 2008/0073235 A1* | 3/2008 | Harada | B65B 5/024 206/449 |
| 2010/0016137 A1* | 1/2010 | Benedetti | B65B 61/025 493/162 |
| 2015/0292163 A1* | 10/2015 | Bomstad | D21F 11/14 700/125 |

\* cited by examiner

PROCESSING WEBS USING PRINTED GRAPHIC CODE SYMBOL RELATING TO WEB FEATURES

TECHNICAL FIELD

This application relates to a process, a control device, a computing device and an arrangement for improved manufacturing and processing of webs, and in particular to a process, a control device, a computing device and an arrangement for improved manufacturing and processing of packaging material and packages.

BACKGROUND

Within, for example, the printing and packaging industries, it is common practice to control working operations on a continuous material web by providing guide markings by means of printing on the web, these guide markings being sensed by photocells or other optical devices. These markings or control markings are often printed in a colour tone which makes a clear contrast with its surroundings, preferably black, and is applied on such panels or areas of the material web where no other printed markings or patterns occur. The markings may also be provided by means of magnetically sensible material or with the aid of mechanically sensible markings such as, for example, holes, crease lines or slots.

These guide markings are employed, for example, in the printing of multi-colour print, to adapt the position of the patterns printed with different colours to one another so that the different colour patterns will lie exactly superposed on one another. Another similar field of use is when the intention is, on a previously ready printed material web, to add print at a predetermined place in the print pattern, for example a best before date or the like or when the intention is to provide a printed pattern and a crease line pattern which facilitate fold forming, in register with each other.

Further fields of use are, for example, in those cases where the intention is, in a filling machine or the like, to advance a packaging material web an exact pattern length in order, on the one hand, to have the printed pattern in the same position on all packages, and, on the other hand, to cause the above mentioned crease line pattern to register with the forming devices of the filling machine so that the folding of the material takes place along the crease lines which are predetermined in position.

There is thus a need for an improved manner of determining a correct position for a further processing step to be performed to a packaging web.

SUMMARY

According to one aspect, it is an object of the teachings of this application to overcome the problems listed above by providing an arrangement comprising: at least one first processing machine arranged to process a web, a scanning device arranged to scan said web, and a computing device configured to: receive image data of said web, analyze said data, and generate a graphic code symbol based on said analysis, and a printing device arranged to print said graphic symbol on said web for marking a web with data relating to features of said web. The arrangement further comprises at least one second processing machine arranged to further process said web, a reading device arranged to read said graphic code symbol of said web, and a control device configured to: receive image data relating to said graphic code symbol, decode said graphic code symbol to retrieve information regarding features of said web, and control said at least one second processing machine to adapt said further processing of said web according to said features.

According to one aspect, it is an object of the teachings of this application to overcome the problems listed above by providing a process for controlling an arrangement comprising at least one first processing machine arranged to process a web, said process comprising: scanning said web to provide data of said web, analyzing said data, generating a graphic code symbol based on said analysis, and printing said graphic symbol on said web for marking a web with data relating to features of said web. The arrangement further comprises at least one second processing machine arranged to further process said web, and the process further comprises: reading said graphic code symbol of said web, decoding said graphic code symbol to retrieve information regarding features of said web, and controlling said at least one second processing machine to adapt said further processing of said web according to said features.

Such arrangements and processes enable an adaptation of further processing of a web to account for variations thereby reducing the failure rate of an overall process and reducing the waste.

According to one aspect, it is an object of the teachings of this application to overcome the problems listed above by providing an arrangement comprising: at least one first processing machine arranged to process a web, a scanning device arranged to scan said web, and a computing device configured to: receive image data of said web, analyze said data, and generate a graphic code symbol based on said analysis, and a printing device arranged to print said graphic symbol on said web for marking a web with data relating to features of said web.

According to one aspect, it is an object of the teachings of this application to overcome the problems listed above by providing a process for controlling an arrangement comprising at least one first processing machine arranged to process a web, said process comprising: scanning said web to provide data of said web, analyzing said data, generating a graphic code symbol based on said analysis, and printing said graphic symbol on said web for marking a web with data relating to features of said web.

According to one aspect, it is an object of the teachings of this application to overcome the problems listed above by providing a computing device comprising a controller configured to: receive image data of said web from a scanning device arranged to scan said web, analyze said data, generate a graphic code symbol based on said analysis, and cause a printing device to print said graphic symbol on said web for marking a web with data relating to features of said web.

Such an arrangement, a process and a computing device enables identification of discrepancies for future adaptation.

According to one aspect, it is an object of the teachings of this application to overcome the problems listed above by providing an arrangement comprising at least one second processing machine arranged to further process said web, a reading device arranged to read said graphic code symbol of said web, and a control device configured to: receive image data relating to said graphic code symbol, decode said graphic code symbol to retrieve information regarding features of said web, and control said at least one second processing machine to adapt said further processing of said web according to said features.

According to one aspect, it is an object of the teachings of this application to overcome the problems listed above by providing a process controlling an arrangement comprising at least one second processing machine arranged to further process said web, the process comprising: reading said graphic code symbol of said web, decoding said graphic code symbol to retrieve information regarding features of said web, and controlling said at least one second processing machine to adapt said further processing of said web according to said features.

According to one aspect, it is an object of the teachings of this application to overcome the problems listed above by providing a control device comprising a controller configured to: receive image data relating to a graphic code symbol, decode said graphic code symbol to retrieve information regarding features of a web, and control at least one second processing machine to adapt a further processing of said web according to said features.

Such an arrangement, a process and a control device enables an adaptation of further processing of a web to account for variations and discrepancies thereby reducing the failure rate of an overall process and reducing the waste.

The inventors of the present invention have realized, after inventive and insightful reasoning, that by identifying discrepancies in feature alignment for an individual web or a series of web, marking the web with information identifying such discrepancies further processing may easily be adapted to adapt to the discrepancies thereby reducing the failure rate of the overall process.

The teachings herein find use in, but are not limited to, manufacturing of packaging goods and material.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which:

FIG. 2 shows an exemplary web which the teachings herein may be applied to;

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
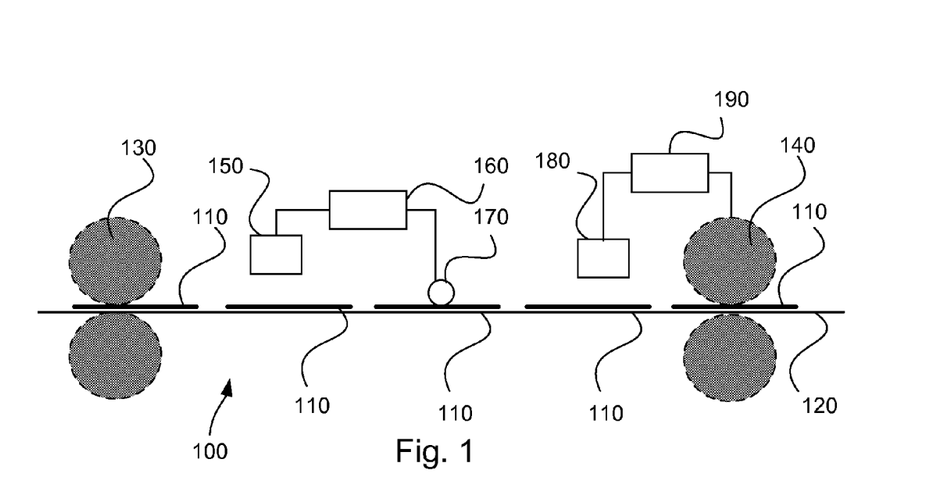
FIG. 1 shows a schematic illustration of an arrangement for a process according to an embodiment of the teachings of this application.

FIG. 1 shows a schematic illustration of an arrangement 1 for a process according to an embodiment herein. The arrangement 100 comprises a means for transporting 120 a web 110 or a packaging material. In one embodiment the means for transporting 120 is a feeding belt. In one embodiment the means for transporting 120 is comprised by the web 110 itself. The transport means 120 may also include actual transport or shipping of an intermediate product for further processing at another production site or a remote location in the same production site. The arrangement 100 further comprises at least one first processing machine 130 and at least one second processing machine 140. In one embodiment one or both of the at least one first processing machine 130 and the at least one second processing machine 140 are comprised in the means for transporting 120 the web 110.

In one embodiment the first processing machine 130 is a creasing machine, a perforation machine or a printing machine. It should be noted that the at least one first processing machine 130 may be a combination of different processing machines 130.

In one embodiment the second processing machine 140 is a machine adapted for cutting such as a punch or a cutter, a perforation machine or a printing machine. It should be noted that the at least one second processing machine 140 may be a combination of different processing machines 140.

The arrangement 100 further comprises a reading device 150 arranged to scan the webs 110 as they are transported past it. In one embodiment the scanning device is an optical scanning device 150. In one embodiment the optical scanning device 150 is a line by line scanning device or a video camera for continuously scanning a passing web 110. In one embodiment the optical scanning device 150 is a camera for scanning a passing web 110 with one (instantaneous) image to be analyzed.

The arrangement 100 further comprises a controlling or computing device 160 operably connected to the scanning device 150. The computing device 160 is arranged to analyze data provided by the scanning device 150 and to control a printing device 170 operably connected to the computing device 160.

Figure 2:
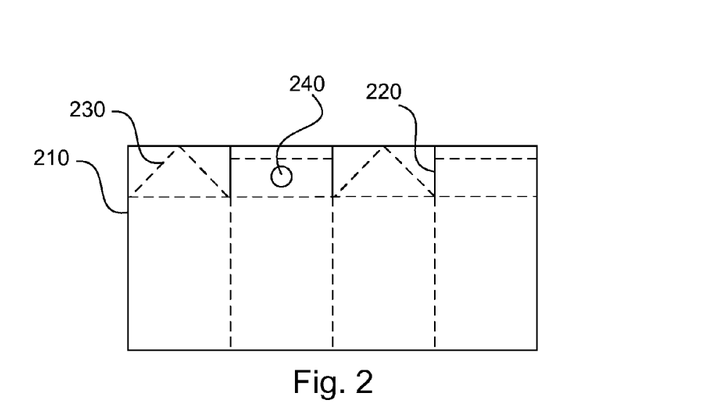

FIG. 2 shows a schematic view of a web 210 for a product to be manufactured through a folding process, such as a beverage carton. The web 210 is arranged with a number of cutting lines 220 (indicated with full lines) and crease rules 230 (dashed lines). The crease rules 230 and the cutting lines 220 may be applied to the web in a combined creasing and beak machine or in a separate creasing machine and a separate beak machine.

The web 210 is also arranged with a cut hole 240 which can be fitted with a cap (not shown in FIG. 2).

Due to (accidental) movement of the web 210, poor alignment of the separate processing machines and/or general wear and tear of for example a beak (not shown) the alignment of the hole 240 and the crease lines 230 and/or the cutting lines 220 may present inconsistencies or errors in the millimeter range. Such inconsistencies lead to that the cap may be erroneously mounted on the finished product resulting in an increased failure rate for the process in turn resulting in an increased waste of webs and/or faulty end products.

Figure 3A:
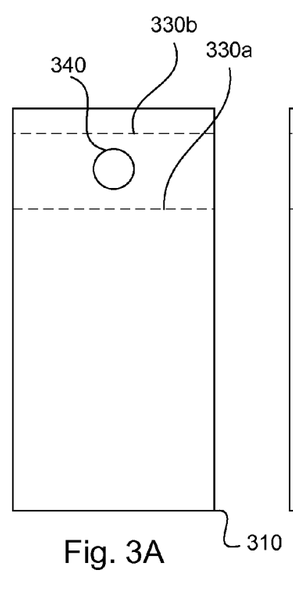
FIGS. 3A, 3B and 3C each shows a web having been subjected to a series of processing steps.
Figure 3B:
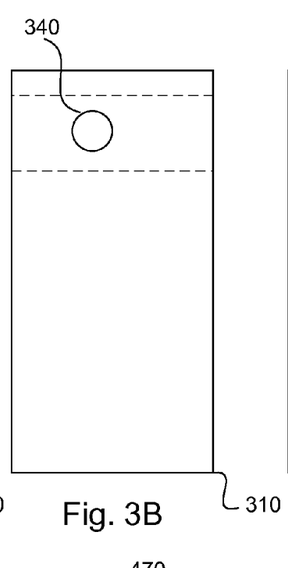

FIG. 3A shows a schematic view of a web 310. The web 310 is a part of the web 210 of FIG. 2. The web 310 is arranged with two crease lines 330a and 330b and a cut hole 340. The cut hole 340 is at a specific distance from the crease rules 330a and 330b and the cutting lines. FIG. 3B shows a schematic view of a web 310 which is arranged with a cut hole 340 which shows an inconsistency in its placement. In the example of FIG. 3B the cut hole 340 is arranged too far to the left (the dimensions have been exaggerated for illustrative purposes). As a cap 350 is mounted on the web 310, see FIG. 3C, the cap will not be mounted over the cut hole 340 as intended and the resulting product will be of inferior quality and most likely have to be discarded, thereby increasing he failure rate of the production line.

Figure 4A:
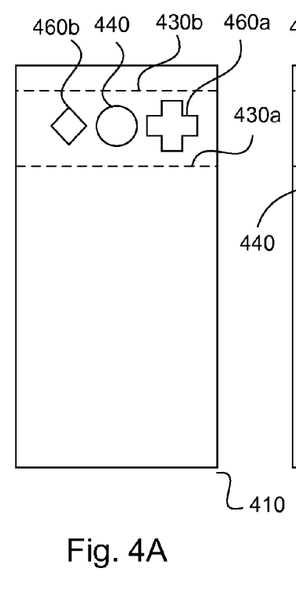
FIGS. 4A, 4B and 4C each shows a web according to an embodiment of the teachings of this application having been subjected to a series of processing steps.

FIG. 4A shows a web 410 according to an embodiment of the teachings herein. The web 410 corresponds to the web 310 of FIG. 3A. The web 410 is arranged with markings 460a and 460b. It should be noted that although two markings 460 are shown in FIG. 4A any number (including one) can be utilized within the scope of the teachings of this application.

In the following description simultaneous reference will be given to FIGS. 1, 4 and FIG. 6A which is an illustration of a flowchart according to an embodiment of the teachings herein for providing a web with a graphic code symbol.

Figure 4B:
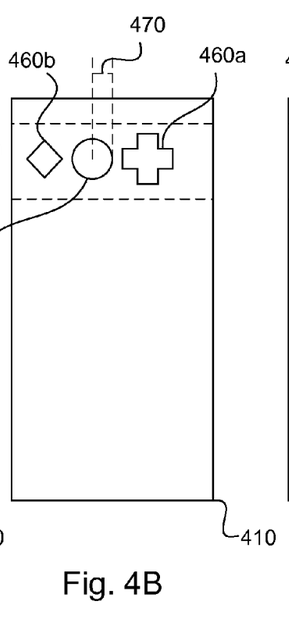

In one embodiment the scanning device 150 of FIG. 1 is configured to scan 610 the web 110, 410 and to provide image data that is received by the computing device 160 which data is to be analyzed 620 by the computing device 160. The analysis is performed to identify features 622, such as crease lines 430a, 430b and cut holes 440 of a web. The features may be reference lines and/or prints. One such reference print may be what is called a mouse trap in the technical field. Other features may be printed text or images or other prints. The analysis is further performed by the computing device 160 to determine a distance 625 between two identified features 430, 440 and compare the determined distance 628 to a template. The template is a data representation of the web 410 stored in a memory (internal or external) of the computing device 160 and comprises all intended relative distances between or absolute coordinates of features 440, 430 of the web 410. FIG. 4B shows a web 410 according to an embodiment of the teachings herein, where the web 410 is arranged with a cut hole 440 being arranged slightly off the intended position. The web 410 corresponds to the web 310 of FIG. 3B. In FIG. 4B, the distance determined by the computing device 160 is referenced 470 and indicates the distance 470 between the center point of the cut hole 440 and the intended position of the cut hole 440 (as is illustrated by FIG. 4A, where the corresponding distance would be zero and is not shown in FIG. 4A). Although the distance 470 is shown to be one dimensional in FIG. 4B, it should be noted that the distance 470 may also be two dimensional giving the coordinates for a feature or the difference in coordinates for a feature from the intended position.

Figure 4C:
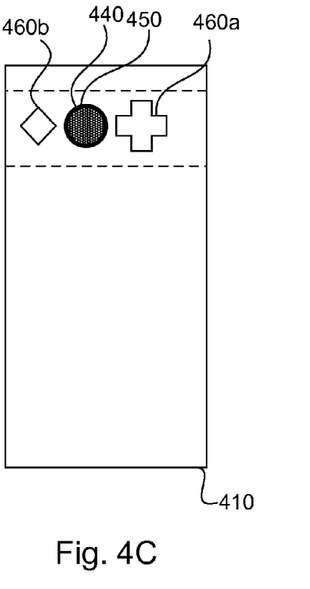

The computing device 160 is further configured to create graphic code symbol 630 and instruct printing means 170, such as an inkjet printer, to print 640 the graphic code symbol on the web 410. In FIGS. 4A, 4B and 4C the webs 410 are provided with a graphic code symbol comprising two graphic code prints 460a and 460b.

The graphic code symbol 460 is able to carry information which identifies the features and their actual locations on the particular web 410. The information may be given as coordinates (relative or absolute) for each feature or, alternatively only for the features that are incorrectly disposed. By providing information only for the incorrectly disposed features enables a faster analysis and encoding and decoding of the graphic code symbol 460. This is beneficial in that it allows the graphic code symbol 460 to be printed at a smaller size.

The graphic code symbol 460 thus allows for a subsequent adaptation or accommodation of the remaining production steps and second processing machines 140 according to individual errors and misplacements of a web 110, 410 thereby reducing the failure rate for the complete production.

Figure 6A:
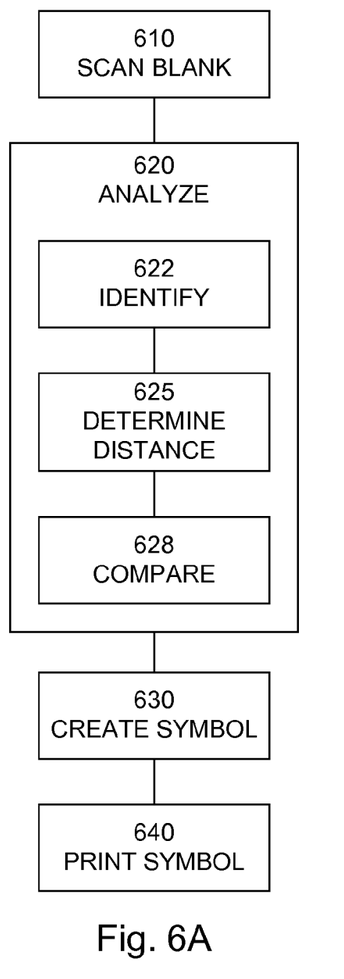
FIGS. 6A and 6B are each an illustration of a flowchart of a process according to an embodiment of the teachings herein.
Figure 6B:
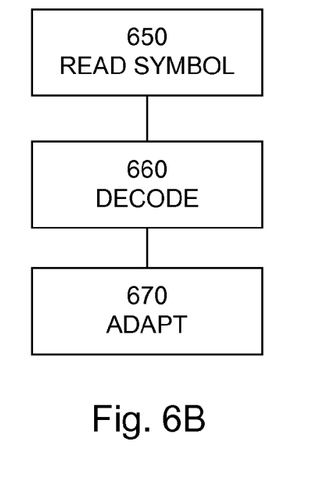

FIG. 6B shows an illustration of a flowchart for a method according to an embodiment herein for a process of reading and decoding a graphic code symbol 460.

The arrangement 100 further comprises a reading device 180. The reading device 180 may be implemented as a still image camera or a video camera for reading 650 the graphic code symbol 460. The reading device 180 is coupled to a control device 190. In one embodiment the coupling is effected by the reading device 180 being incorporated in the control device 190. The reading device 180 and/or the control device 190 are/is arranged to decode 660 the graphic code symbol 460 to retrieve the information according to the position of the features on each web 410 or a series of webs 410 thereby constituting decoding means for decoding the graphic code symbols 460.

In one embodiment the computing device (160) is configured to generate a graphic code symbol 460 carrying an identifier for the web 110, 210, 410 and to store feature information in a data storage (not shown). The data storage may be implemented to be part of the computing device 160. The data in the data storage may be transferred to a remote data storage associated with the control device 190 (or incorporated in the control device 190) or the same data storage may be connected also to the control device 190. The connection may be effected through a wired connection or through an internet connection. In such an embodiment the control device 190 is configured to decode the graphic code symbol 460 to retrieve an identification of the web 110, 410 (or series of webs) and to retrieve feature information from a data storage (not shown). This allows for smaller graphic code symbols to be used which enables an easier positioning of the graphic code symbol 460 and causes less disturbance to the visual appearance of a resulting product.

The reading device 180 and/or the control device 190 may be configured to analyze an image or a video stream of a web 110 to identify and decode the graphic symbol 460. Through such analysis it is possible to identify a graphic code symbol 460 irrespective of its position on the web 410. This allows for a flexible arrangement 100 that can be easily adopted to different sized webs having different features.

The control device 190 is operably connected to the at least one second processing machine 140 for adapting 670 or accommodating its operation according to the information retrieved from the graphic code symbol 460.

Figure 3C:
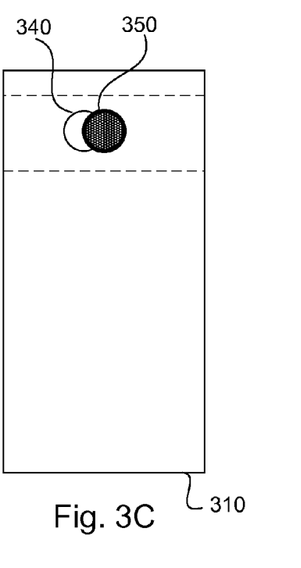

FIG. 4C shows a resulting web 410 corresponding to the web 310 of FIG. 3C. A second processing machine 140 arranged to mount a cap 450 on a web has successfully been adapted and mounted the cap 450 over the hole 440 even though the hole 440 is displaced somewhat to the left (compare the webs 410 FIGS. 4A and 4B).

In one embodiment the controlling device 190 and computing device 160 are incorporated in the same control means. This allows for a centralized control of the arrangement 100.

In one embodiment the first processing machine 130 and second processing machine 140 are arranged at different locations or productions sites. In such an embodiment the scanning device 150, computing device 160 and printing device 170 are arranged at a first location and the reading device 180 and the control device 190 are arranged at a second location. This allows for a split arrangement 100 where an intermediate product is produced at one first location and later further processed at a second (remote) location.

With reference to FIGS. 6A and 6B it should be noted that the process of FIG. 6A will be executed at the first location and the process of FIG. 6B will be executed at the second location. It should be noted that if a control or computing device is configured to execute the processes of FIGS. 6A and/or 6B the scanning of the web 110, 410 is effected by the computing device 160 receiving the image data comprising data on the features of the web 110, 410 and the reading 650 of the graphic code symbol 460 is effected by the control device 190 receiving the image data comprising the graphic code symbol 460.

The code symbol 460 shown in FIGS. 4A, 4B and 4C comprises two code parts 460a and 460b. The shape and placement (and possibly also number of code parts) is arranged to carry information. The control device 190 is thus configured to read the code parts and based on their shape, numbers and individual placement determine the information that the code symbol carries.

It should be noted that even though the description herein is focused on describing distances of features, the graphic code symbol may also carry information on other factors, such as the shape of a feature, colors to be used or material properties. For example, in a processing arrangement where two different kinds of caps are possible the webs could easily be scanned for automatic redirection to the cap intended for the particular web or batch of webs.

Figure 5A:
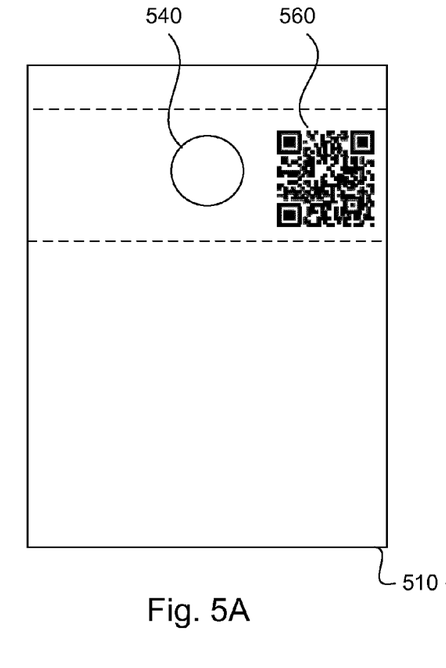
FIGS. 5A and 5B each shows an illustration of a web according to an embodiment of the teachings of this application.
Figure 5B:
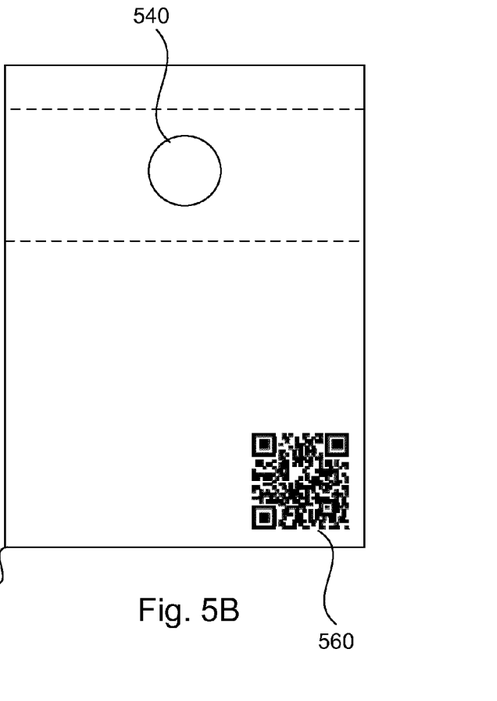

FIGS. 5A and 5B each shows a web 510 provided with each a graphic code symbol 560. As can be seen the graphic code symbol 560 may be placed at any suitable position on the web 510. In this embodiment the graphic code symbol constitutes a so-called QR-code (Quick Response). QR-codes are two dimensional graphic codes that carry information coded according to a standard. They are thus easy to identify and to decode and provide high flexibility in being used between production arrangements of different production sites or companies.

In one embodiment the printing device 170 is arranged to print the graphic code symbol 460, 560 in a manner not visible to the naked eye, such as by using ultra violet ink for example. This allows for the graphic code symbol 460, 560 to be placed at any location on the web 110, 210 without disturbing the visual appearance of the resulting product.

In one embodiment the printing device 170 is arranged to print the graphic code symbol 460, 560 on a side of the web 110, 210 to be an inside of a resulting product. This allows for the graphic code symbol 460, 560 to be placed at any location on the web 110, 210 without disturbing the visual appearance of the resulting product.

In one embodiment the printing device 170 is arranged to print the graphic code symbol 460, 560 in a manner that is easy to remove from the resulting product (or an intermediate product). This allows for the graphic code symbol 460, 560 to be placed at any location on the web 110, 210 without disturbing the visual appearance of the resulting product.

An arrangement as disclosed herein is particularly beneficial to be used in arrangements where the first processing machine 130 has a greater inertia than the second processing machine 140, such as when the first processing machine is a creasing line machine and the second processing machine is a printing machine. The printing machine can then easily be moved to accommodate for any variations resulting from the creasing line machine.

Figure 7:
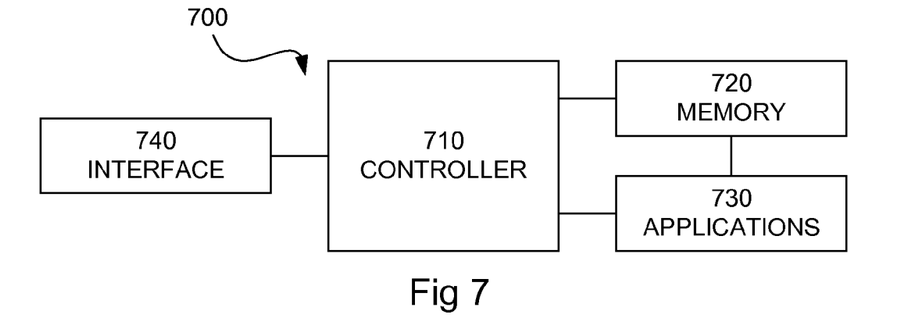
FIG. 7 is a schematic view of the general structure of a computing device disclosed here.

FIG. 7 shows a schematic view of the general structure of a computing device 700 according to an embodiment herein. The computing device 700 of FIG. 7 is one implementation of the computing device referenced 160 in FIG. 1. The computing device 700 of FIG. 7 is one implementation of the control device referenced 190 in FIG. 1. The computing device 700 comprises a controller 710 which is responsible for the overall operation of the computing device 700 and is preferably implemented by any commercially available CPU ("Central Processing Unit"), DSP ("Digital Signal Processor") or any other electronic programmable logic device. The controller 710 may be implemented using instructions that enable hardware functionality, for example, by using executable computer program instructions in a general-purpose or special-purpose processor that may be stored on a computer readable storage medium (disk, memory etc) 240 to be executed by such a processor. The controller 710 is configured to read instructions from the memory 720 and execute these instructions to control the operation of the computing device 700. The memory 720 may be implemented using any commonly known technology for computer-readable memories such as ROM, RAM, SRAM, DRAM, CMOS, FLASH, DDR, EEPROM memory, flash memory, hard drive, optical storage or any combination thereof. The computing device 700 further comprises one or more application 730. The applications are sets of instructions that when executed by the controller 710 control the operation of the computing device 700. The memory 720 is used for various purposes by the controller 710, one of them being for storing application data and program instructions 250 for various software modules in the computing device 700. The software modules include a real-time operating system, drivers for a man-machine interface 220, an application handler as well as various applications 730. The controller 710 is configured to operably execute the application 730 such as image analysis software using software stored in the memory 720 which software includes various modules, protocol stacks, drivers, etc.

The computing device 700 further comprises an interface 740 for communicating with other devices such as an image scanning device (referenced 150 in FIG. 1) and a printing device (referenced 170 in FIG. 1).

The disclosure here includes an arrangement (100) comprising: at least one first processing machine (130) arranged to process a web (110, 210, 310, 410, 510); a scanning device (150) arranged to scan (610) the web (110, 210, 310, 410, 510); and a computing device (160) configured to: receive image data of the web (110, 210, 310, 410, 510); analyze (620) the data; and generate (630) a graphic code symbol (460, 560) based on the analysis; and a printing device (170) arranged to print (640) the graphic symbol (460, 560) on the web (110, 210, 310, 410, 510) for marking a web (110, 210, 310, 410, 510) with data relating to features (220, 230, 240) of the web (110, 210, 310, 410, 510); the arrangement (100) further comprising: at least one second processing machine (140) arranged to further process the web (110, 210, 310, 410, 510); a reading device (180) arranged to read (650) the graphic code symbol (460, 560) of the web (110, 210, 310, 410, 510); and a control device (190) configured to: receive image data relating to the graphic code symbol (460, 560); decode (660) the graphic code symbol (460, 560) to retrieve information regarding features (220, 230, 240) of the web (110, 210, 310, 410, 510); and control the at least one second processing machine (140) to adapt (670) the further processing of the web (110, 210, 310, 410, 510) according to the features (220, 230, 240). The computing device (160) and the control device (190) are comprised in one device, the at least one first processing machine (130) is located in a first location and the at least one second processing machine (140) is located in a second location, and the control device (190) is configured to retrieve the information regarding feature by decoding the graphic code symbol (460, 560) to retrieve an identifier for the web and retrieve information regarding the feature from a data storage based on the identifier.

Also disclosed is a process for controlling an arrangement (100) comprising at least one first processing machine (130) arranged to process a web (110, 210, 310, 410, 510), the process comprising: scanning (610) the web (110, 210, 310, 410, 510) to provide data of the web (110, 210, 310, 410, 510); analyzing (620) the data; generating (630) a graphic code symbol (460, 560) based on the analysis; and printing (640) the graphic symbol (460, 560) on the web (110, 210, 310, 410, 510) for marking a web (110, 210, 310, 410, 510) with data relating to features (220, 230, 240) of the web (110, 210, 310, 410, 510);

the arrangement (100) further comprising at least one second processing machine (140) arranged to further process the web (110, 210, 310, 410, 510), and the process further comprising: reading (650) the graphic code symbol (460, 560) of the web (110, 210, 310, 410, 510); decoding (660) the graphic code symbol (460, 560) to retrieve information regarding features (220, 230, 240) of the web (110, 210, 310, 410, 510); and controlling the at least one second processing machine (140) to adapt (670) the further processing of the web (110, 210, 310, 410, 510) according to the features (220, 230, 240).

Also disclosed is a an arrangement (100) comprising: at least one first processing machine (130) arranged to process a web (110, 210, 310, 410, 510); a scanning device (150) arranged to scan (610) the web (110, 210, 310, 410, 510); and a computing device (160) configured to: receive image data of the web (110, 210, 310, 410, 510); analyze (620) the data; and generate (630) a graphic code symbol (460, 560) based on the analysis; and a printing device (170) arranged to print (640) the graphic symbol (460, 560) on the web (110, 210, 310, 410, 510) for marking a web (110, 210, 310, 410, 510) with data relating to features (220, 230, 240) of the web (110, 210, 310, 410, 510).

Also disclosed is a computing device (160) comprising a controller (710) configured to: receive image data of the web (110, 210, 310, 410, 510) from a scanning device (150) arranged to scan (610) the web (110, 210, 310, 410, 510); analyze (620) the data; generate (630) a graphic code symbol (460, 560) based on the analysis; and cause a printing device (170) to print (640) the graphic symbol (460, 560) on the web (110, 210, 310, 410, 510) for marking a web (110, 210, 310, 410, 510) with data relating to features (220, 230, 240) of the web (110, 210, 310, 410, 510).

Also disclosed is a control device (190, 700) comprising a controller (710) configured to: receive image data relating to a graphic code symbol (460, 560); decode (660) the graphic code symbol (460, 560) to retrieve information regarding features (220, 230, 240) of a web (110, 210,310, 410, 510); and control at least one second processing machine (140) to adapt (670) a further processing of the web (110, 210, 310, 410, 510) according to the features (220, 230, 240).

One benefit of the teachings herein is that the process and arrangement provides an end product of high quality.

Another benefit of the teachings herein is that the process and arrangement provides reduces the waste and the failure rate of the overall process. It further allows for accommodating second processing machines to intermediate products having flaws.

The teachings herein find use in manufacturing and producing products from webs being provided with features by different processing machines.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An arrangement comprising:
   at least one first processing machine arranged to process a web;
   a scanning device arranged to scan; and
   a computing device configured to:
      receive image data of said web;
      analyze said data; and
      generate a graphic code symbol based on said analysis; and
   a printing device arranged to print said graphic symbol on said web for marking a web with data relating to features of said web.

2. The arrangement of claim 1, wherein said computing device is configured to analyze said image data by:
   identifying at least one of said features and
   comparing said identified feature to a template.

3. The arrangement of claim 1, wherein said printing device is arranged to print the graphic code symbol in a manner not visible to the naked eye.

4. The arrangement claim 1, wherein said printing device is arranged to print the graphic code symbol on a side of the web 110, 210 to be on an inside of a resulting product.

5. The arrangement of claim 1, further comprising: at least one second processing machine arranged to further process said web
   a reading device arranged to read said graphic code symbol of said web; and
   a control device configured to:
   receive image data relating to said graphic code symbol;
   decode said graphic code symbol to retrieve information regarding features of said web; and
   control said at least one second processing machine to adapt said further processing of said web according to said features.

6. An arrangement comprising:
   at least one processing machine arranged to process a web;
   a reading device arranged to read a graphic code symbol of said web; and
   a control device configured to:
      receive image data relating to said graphic code symbol;
      decode said graphic code symbol to retrieve information regarding features of said web; and
      control said at least one processing machine to adapt said further processing of said web according to said features.

7. The arrangement according to claim 6, wherein said control device is configured to retrieve said information regarding the features of said web by decoding said graphic code symbol to retrieve an identifier for said web and retrieve information regarding said feature from a data storage based on said identifier.

8. The arrangement of claim 6, wherein the control device is configured to control the processing machine to process the web according to the information retrieved regarding features of the web, such that different processing of the web is carried out for different features on the web.

9. A process for controlling an arrangement comprising at least one first processing machine arranged to process a web, said process comprising:
   scanning said web to provide data of said web;
   analyzing said data;
   generating a graphic code symbol based on said analysis; and printing said graphic symbol on said web for marking a web with data relating to features of said web.

10. The process of claim 9, further comprising at least one second processing machine arranged to further process the web, the process further comprising:
  decoding said graphic code symbol to retrieve information regarding the features of said web; and
  controlling said at least one second processing machine to adapt said further processing of said web according to said features.

11. A process for controlling an arrangement comprising at least one processing machine arranged to process a web, said process comprising:
  reading a graphic code symbol of said web;
  decoding said graphic code symbol to retrieve information regarding features of said web; and
  controlling said at least one second processing machine to adapt said further processing of said web according to said features.

12. The method of process of claim 11, wherein the controlling of the processing machine to adapt the further processing of the web according to the features, includes carrying out different processing of the web for different features on the web.

* * * * *